E. A. & C. M. STRATTON.

Spirit Level.

No. 100,463.

Patented March 1, 1870.

Witnesses

C. E. Truxland
Ogden Griswold

Inventors

Edwin A. Stratton
Charles M. Stratton
By J. A. Curtis
their Attorney

United States Patent Office.

EDWIN A. STRATTON AND CHARLES M. STRATTON, OF GREENFIELD, MASSACHUSETTS.

Letters Patent No. 100,463, dated March 1, 1870.

IMPROVEMENT IN SPIRIT-LEVEL.

The Schedule referred to in these Letters Patent and making part of the same.

To all whom it may concern:

Be it known that we, EDWIN A. STRATTON and CHARLES M. STRATTON, both of Greenfield, in the county of Franklin, and State of Massachusetts, have invented a new and useful Improvement in Spirit-Levels; and we do hereby declare the following, when taken in connection with the accompanying drawings and the letters of reference marked thereon, to be a full, clear, and exact description thereof, and which said drawings constitute part of this specification, and represent in—

Figure 1 a side view of a spirit-level with our invention applied.

Figure 1:
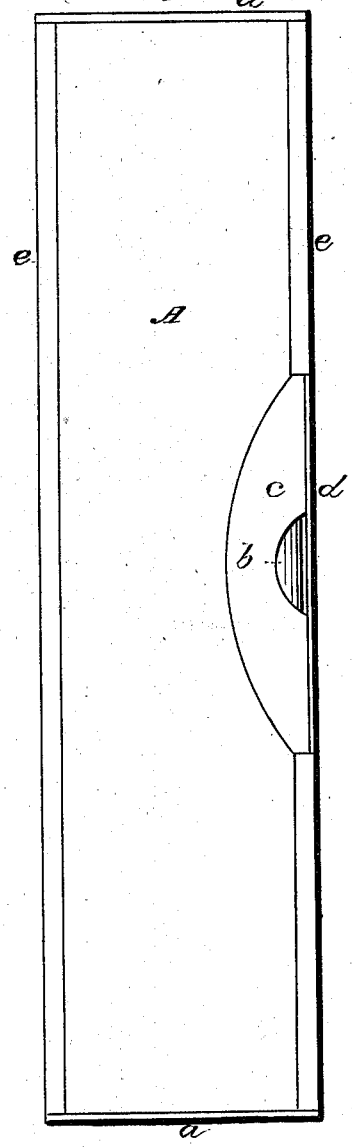
Figure 3:
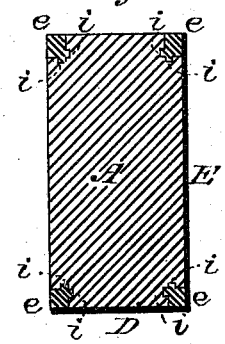
Figure 3 is a transverse section, through line B C of fig. 2.
Figure 2:
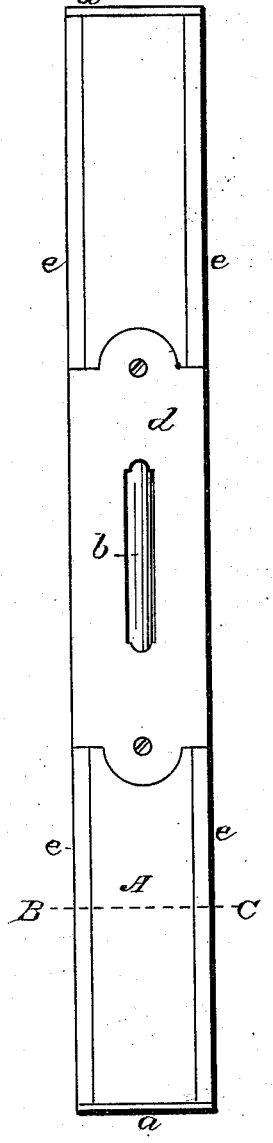
Figure 2 represents a plan view of the same.

Our invention relates to that class of spirit-levels wherein the stock or bar is made of wood; and It consists of a metallic rod having longitudinal projections thereon, and so constructed that, if one corner of the stock be cut away longitudinally, of the same form in cross-section as the form of the metallic rod in its cross-section, the said rod may be forced into the space so made from one end, and the longitudinal projections upon said rod will retain it securely in its place, said rod, when there is one placed at each corner of the bar or stock of the spirit-level, serving to protect the corners of the wood from abrasion and injury, and assisting in preserving the stock, so that it may remain true and perfect in the operation of the level.

That others skilled in the art may be able to make and use the same, we will proceed to describe its construction and its application to use.

In the drawings—

A represents the stock in which the bubble-glass is placed, which stock may be prismatic in form in its cross-section, the usual form adopted, or it may be of any other desirable form.

The small portion of wood at each corner of the stock may be removed longitudinally, in the following manner:

A small circular saw may be arranged so that its teeth may project above its table or platform just enough to enter the wood to make one of the grooves $i$.

If the guide usually attached to the table be adjusted rightly, the stock A may be placed upon the table upon its side D, and the saw being put in motion, if the stock be passed along the table over the saw, one of the grooves $i$ is made. The stock is then placed upon the other side E, and the other groove $i$ in the same corner is made, which operation removes the wood along that corner of the stock.

A metallic rod, of a size in its cross-section to fill this space occasioned by the removal of the wood, and with longitudinal projections thereon to fill the grooves $i$, is placed in said space by inserting the end of the rod in the end of the space or groove, and forcing it in endwise or longitudinally. The ends of the rods may be finished off square with the end of the stock, and a metallic piece, $a$, may be secured to the end of the stock, covering the ends of the metallic rods $e$ to make a better finish and prevent the rods from coming out. The metallic rods $e$ may be drawn by the same operation as in drawing wire, or they may be cast or made by any other convenient and desirable process. We prefer the process of drawing them.

This invention, it is evident, may be applied to spirit-levels of any form and size, the stocks of which are made of wood or of any material other than metal which can be operated upon easily, and the form of the grooves $i$ or of the rods $e$ in their cross-section may be varied without in the least departing from the principle of its operation.

The longitudinal projections which fit the grooves $i$ might be sufficiently strong and equally operative if they occurred at intervals along the rod, and a saving of stock be made thereby; but such construction would be merely an equivalent to that herein shown, while the difficulty of manufacture would be increased unless the rods were cast.

We are aware that metallic pieces have heretofore been screwed to the angles of spirit-levels having a wooden stock; and we are also aware that a system of grooves and tenons has heretofore been used in the construction of wooden boxes, and we do not claim the same or either of them separately considered; but Having described our invention,

What we claim as new, and desire to secure by Letters Patent, is—

As a new article of manufacture, an improved spirit-level, having the corners of the wooden stock A protected by the metallic rods $e$, attached and secured in place, substantially as and for the purposes specified.

EDWIN A. STRATTON.
CHARLES M. STRATTON.

Witnesses:
WENDELL T. DAVIS,
AUSTIN DE WOLF.